July 22, 1958  H. LOWENTHAL  2,844,072
PHOTOGRAPHIC OBJECTIVE
Filed Oct. 8, 1956
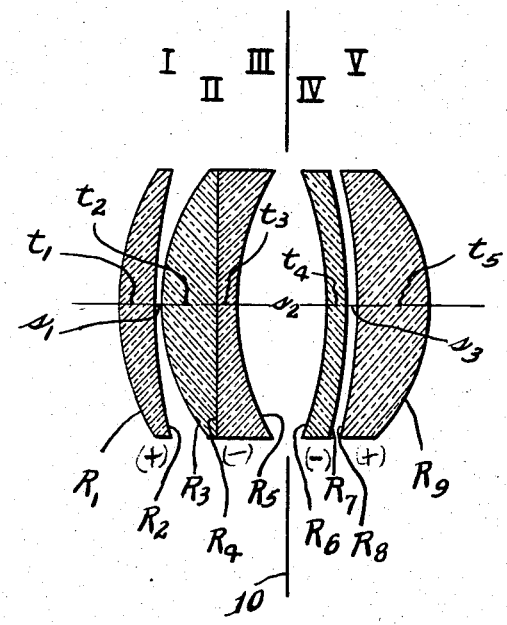
Inventor.
Herman Lowenthal.
Attorneys.

United States Patent Office 2,844,072
Patented July 22, 1958

2,844,072
PHOTOGRAPHIC OBJECTIVE

Herman Lowenthal, Chicago, Ill., assignor to General Scientific Corporation, Chicago, Ill., a corporation of Illinois Application October 8, 1956, Serial No. 614,592

1 Claim. (Cl. 88—57)

This invention relates to a highly corrected photographic objective which is susceptible to quantity manufacture without excessive cost.

The objective embodying the invention is a modified Gauss type having spaced positive and negative lens components. The new objective is characterized by the ability to cover a large field of view without requiring rare earth glass having a high index of refraction. Such glass is much more costly than conventional optical glass. As a result of the invention a relatively simple photographic objective may be obtained having a fast speed of the order of F:2.7 and provided with corrections comparable to those of more compricated systems. Spherical aberration, sine condition, coma, astigmatism, curvature of field and distortion, as well as the chromatic aberrations, all have relatively small residual values.

In general, the objective embodying the invention consists of five lens elements, only two of which are in physical contact and cemented. The two elements which are cemented have plano surfaces at the cementing region which thus makes adjustments of the two elements simple.

The objective embodying the invention may be characterized generally as having two convergent menisci (front and rear) enclosing two divergent menisci. The divergent meniscus on the long conjugate side is compound. The objective permits an iris diaphragm to be positioned between the two divergent menisci.

I have found that it is not necessary to use high index rare earth glass such as is usually employed for convergent components of an objective in order to reduce aberrations. In face, an objective embodying this invention the desired results to correct coma and oblique spherical aberration can better be achieved by using glass having a lower index of refraction. With a high index glass the index difference between the indices of refraction results in over-correction so that the field is bent backward at the edges and corners.

The refractive indices of the glasses and the respective Abbe V numbers have been selected and assigned to the individual focal lengths of the lens elements in such a way that, in addition to corrections for obtaining a flat field in the focal plane, chromatic aberrations are reduced to a minimum.

The index of refraction of the first meniscus has a medium high value and the index of refraction of the following compound meniscus is lower. The next meniscus in the objective has a moderately high index of refraction and is followed by the last meniscus having a lower index of refraction. The arrangement of the objective embodying the present invention with regard to indices of refraction is, beginning from the front, high, low, high and low. In accordance with the present invention, the differences in index between convergent and divergent components is not less than 0.050 and not more than 0.075.

The compound component is made up of two lens elements each having the same index of refraction. The plano cementing surface between the two elements is effective for the correction of chromatic aberrations. The construction of the two single lens elements of the compound component is such that the respective Abbe V numbers and the radii or the absolute values of the focal lengths thereof each are in about the same ratio, namely about 5:3. Also the outer radius of the compound component toward the long conjugate is greater than 0.3 times the focal length of the system.

It is well known that in an objective consisting of a number of lens components, the illumination of the outer portions of the field is a function of the physical length of the system. The shorter the lens system is, the better the illumination of the outer portions of the field with respect to the center portion of the field. In that regard, the new photographic objective is desirable and has a length of somewhat less than one-half of the focal length of the system. The new objective also has the desirable property of having a comparatively short separation between the front and rear vertices and this short separation is due to the reduced differences between the indices of refraction of the convergent and divergent components of the system.

The new objective has decidedly good off-axis image definition. In a test of a model having a focal length of 3″, a high resolution on the axis was present. Thus using Super XX film, the resolution on the axis was 52 lines per mm. Twenty degrees off the axis, the resolution was still within 80% of the axis resolution. From the limit of 20 degrees off the axis to the edge of the film the objective had better than 50% of the axis resolution.

The components making up an objective embodying the invention easily may be designed so that the thickness of the edge of a lens element is substantial enough to reduce breakage to a minimum.

In comparison to the other types of lens, such as for example the five element Taylor lens, the new objective has sufficient thickness tolerances of the lens elements so that room for adjustment between the component lenses is provided. Thus the new objective may vary in thickness of the various elements and still permit sufficient adjustment of the components so that the overall objective may be adjusted for maximum performance.

A preferred embodiment of the invention is illustrated in the figure of the accompanying drawing. In the drawing the radii of the lens surfaces are indicated by R, the lens thicknesses by $t$ and the air spaces between the elements by $s$.

As illustrated in the drawing, element I is separated from element II by an air space. Elements II and III are cemented together with a plano surface between them. Elements IV and V also are separated by a small air space. The separation between elements III and IV is sufficiently great to permit a diaphragm 10 to be disposed therebetween.

A practical objective embodying the present invention is set forth in the following example:

[EFL=100 mm.  F:2.7.]
[BFD=74.6 mm. (back focal distance).]

| | | Mm. | | |
|---|---|---|---|---|
| I | { | $R_1$= +44.13<br>$t_1$=   5.00<br>$R_2$=+105.00<br>$s_1$=   0.30 | ND=1.670 | V=47.40 |
| II | { | $R_3$= +31.0<br>$t_2$=   9.00<br>$R_4$= Plano | ND=1.617 | V=55.0 |
| III | { | $R_4$= Plano<br>$t_3$=   3.00<br>$R_5$= +19.23<br>$s_2$=  13.50 | ND=1.617 | V=36.6 |
| IV | { | $R_6$= −24.00<br>$t_4$=   3.00<br>$R_7$= −37.90<br>$s_3$=   0.30 | ND=1.720 | V=29.2 |
| V | { | $R_8$=−277.80<br>$t_5$=  11.30<br>$R_9$= −33.46 | ND=1.651 | V=55.8 |

Total axial length=45.40 mm.

It will be noted that the differences between the indices of refraction of elements I and II and III are less than 0.075. The same is true for the differences between the indices in elements IV and V. It also will be noted that the differences in indices of refraction between the convergent elements I, II and V on the one hand and divergent elements III and IV on the other hand is between 0.050 and 0.075.

It further will be noted that the Abbe V numbers of the lens elements in the compound component have a ratio of about 5:3. The radii or the absolute values of the focal lengths of these two lens elements also have a ratio of about 5:3. Also, the outer radius of the compound component toward the long conjugate is greater than 0.3 times the focal length of the entire system.

The objective embodying the present invention is well corrected for spherical aberration, sine condition, coma, astigmatism, curvature of the field and distortion, chromatic aberrations, the small residual values contributing to high performance.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

An F:2.7 photographic objective constructed substantially in accordance with the following data:

[Effective focal length (EFL)=100 mm.]
[Back focal distance (BFD)=74.6 mm.]

| | | Mm. | | |
|---|---|---|---|---|
| I | $R_1=$ | +44.13 | $ND=1.670$ | $V=47.4$ |
| | $t_1=$ | 5.00 | | |
| | $R_2=$ | +105.00 | | |
| | $s_1=$ | 0.30 | | |
| II | $R_3=$ | +31.00 | $ND=1.617$ | $V=55.0$ |
| | $t_2=$ | 9.00 | | |
| | $R_4=$ | Plano | | |
| III | $R_4=$ | Plano | $ND=1.617$ | $V=36.3$ |
| | $t_3=$ | 3.00 | | |
| | $R_5=$ | +19.23 | | |
| | $s_2=$ | 13.50 | | |
| IV | $R_6=$ | −24.00 | $ND=1.720$ | $V=29.2$ |
| | $t_4=$ | 3.00 | | |
| | $R_7=$ | −37.90 | | |
| | $s_3=$ | 0.30 | | |
| V | $R_8=$ | −277.80 | $ND=1.651$ | $V=55.8$ |
| | $t_5=$ | 11.30 | | |
| | $R_9=$ | −33.46 | | | wherein $R_1$, $R_2$ . . . indicate the radii of the individual surfaces counting from the front, $t_1$, $t_2$ . . . indicate the axial thicknesses of the individual elements, $s_1$, $s_2$ and $s_3$ indicate the axial air separations between the components, ND is the index of refraction for the sodium D line and V is the Abbe number.

References Cited in the file of this patent
UNITED STATES PATENTS

| | | |
|---|---|---|
| 1,945,570 | Rudolph | Feb. 6, 1934 |
| 2,487,749 | Wynne | Nov. 8, 1949 |
| 2,649,023 | Tronnier | Aug. 18, 1953 |
| 2,683,398 | Klemt et al. | July 13, 1954 |
| 2,748,656 | Berger et al. | June 5, 1956 |

UNITED STATES PATENT OFFICE

CERTIFICATE OF CORRECTION

Patent No. 2,844,072            July 22, 1958

Herman Lowenthal

It is hereby certified that error appears in the printed specification of the above numbered patent requiring correction and that the said Letters Patent should read as corrected below.

Column 4, line 10, in the table, fourth column thereof, third item, for "V=36.3" read --V=36.6--.

Signed and sealed this 14th day of October 1958.

(SEAL)
Attest:
KARL H. AXLINE
Attesting Officer

ROBERT C. WATSON
Commissioner of Patents